Figure 3:
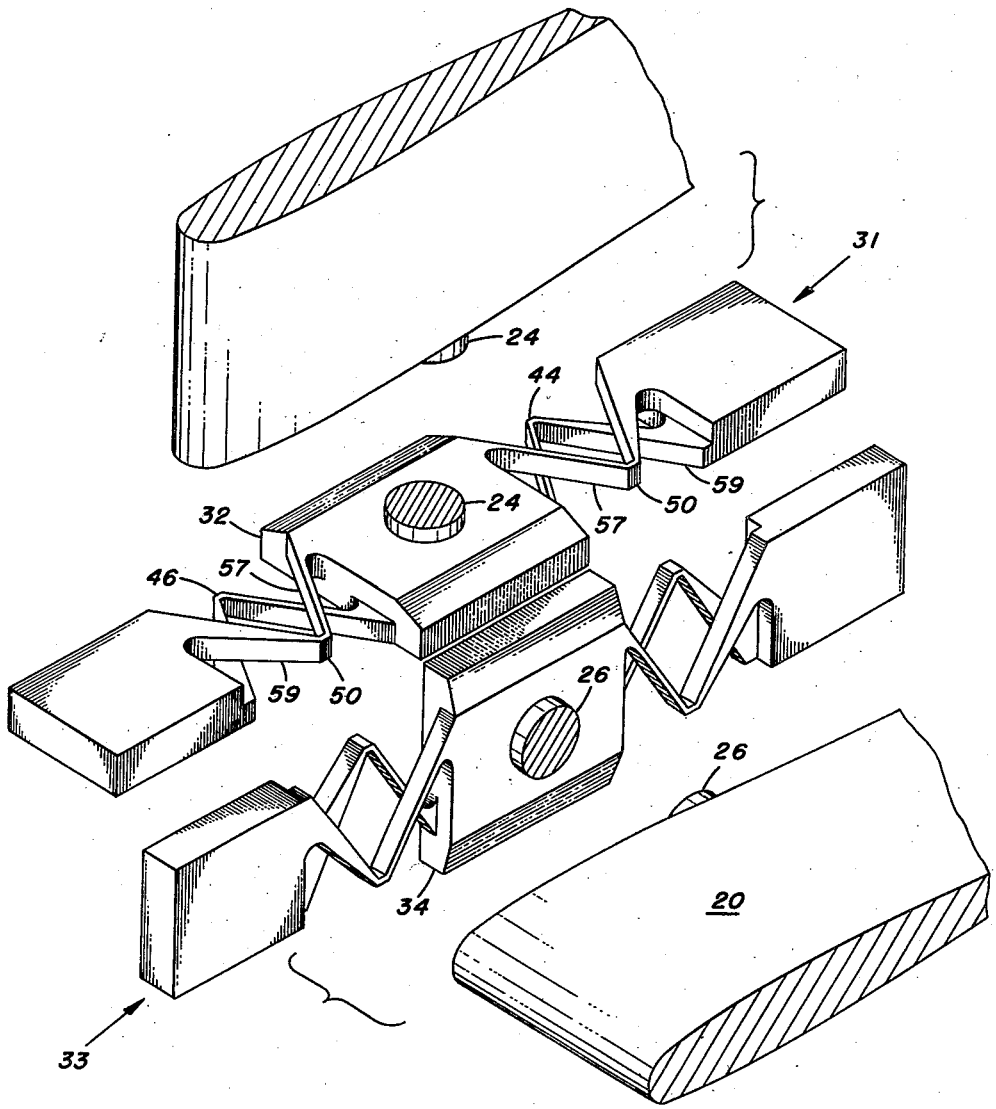

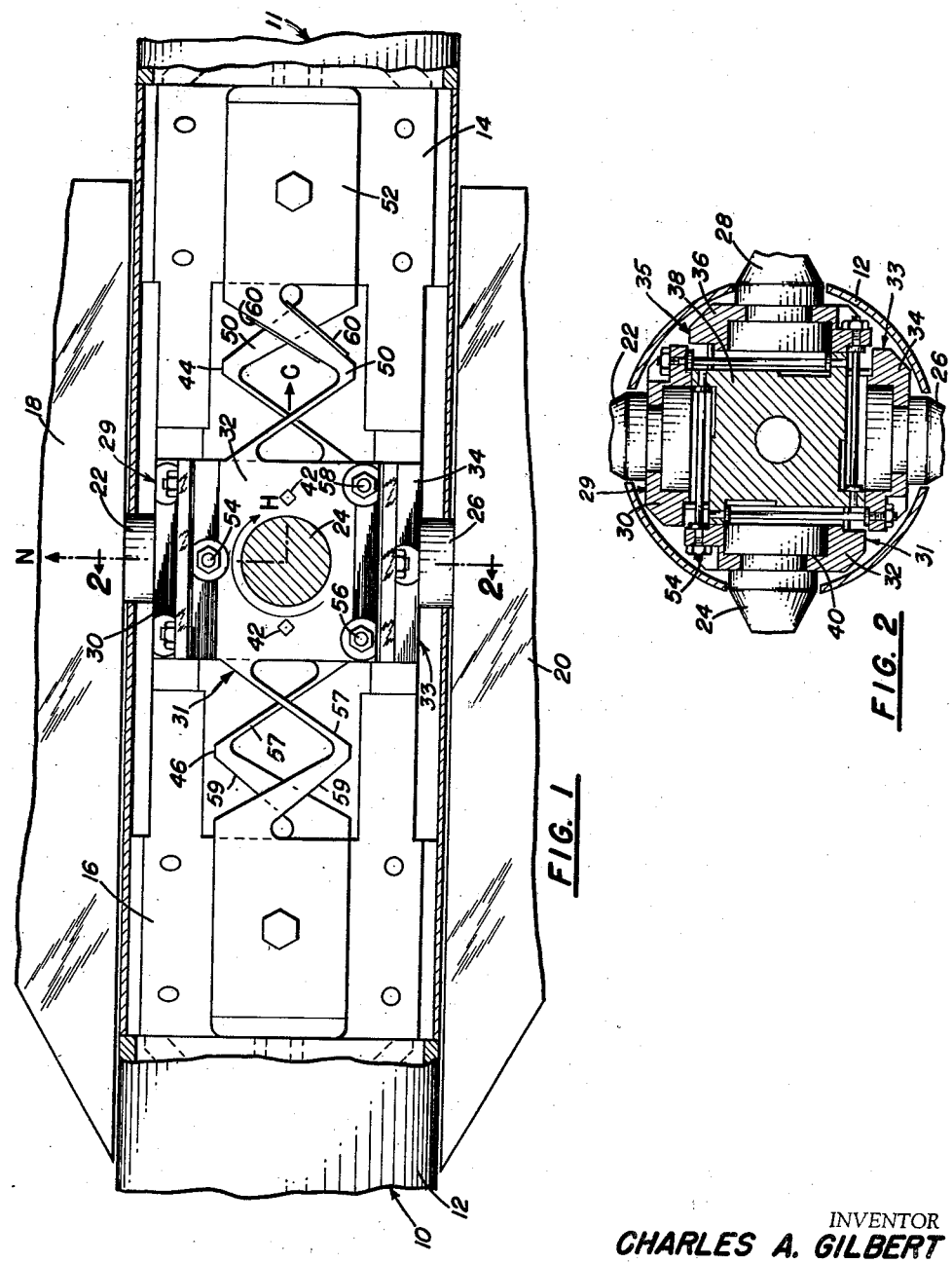

INVENTOR
CHARLES A. GILBERT 2,767,577
Patented Oct. 23, 1956

2,767,577
X-BEAM STRAIN GAUGE DYNAMOMETER

Charles Allen Gilbert, Encino, Calif., assignor, by mesne assignments, to the United States of America as represented by the Secretary of the Navy Application January 13, 1954, Serial No. 403,938

5 Claims. (Cl. 73—147)

This invention relates to aerodynamic forces measuring devices for use with aircraft test models, especially those having cruciform wings.

An object of the invention is to provide means for both easily and accurately measuring normal force, chord force and hinge moments of one or more model wing panels by resolving a wind load applied to the panel into four force vectors whose lines of action are coincident with the neutral axes of four links that comprise two trusses, the magnitude of each force vector being sensed by strain gages on bending beams subjected to said force vectors.

Another object of the invention is to provide a novel dynamometer used in the aforementioned means, which is formed as a truss structure including a central wing panel mounting block having two trusses projecting laterally of it, each truss consisting of two members of V-shape and connected at their inner ends to the mounting block and at their outer ends to suitable anchors.

Other objects and features of importance will become apparent in following the description of the illustrated form of the invention.

In the drawing:

Fig. 1 is a longitudinal sectional view of a model whose wing panels are to be tested by using an embodiment of the invention which is applied thereto, Fig. 2 is a transverse sectional view taken on the line 2—2 of Fig. 1, and Fig. 3 is a perspective view showing parts of two wing panels and their corresponding dynamometers.

In scale model testing the use of cruciform wings has presented problems which are overcome by a three component dynamometer. It is used to measure normal force N, chord force C and hinge moment H on each of the panels of the wing. The dynamometer represents a pin-connected, pin-loaded truss configuration in which the truss members and applied forces (N, C and H) lie in a common plane, establishing a coplanar force system. Since the truss geometry is invariant and the truss member stresses are unique and known for a given applied force, that applied force may be found in terms of the desired aerodynamic components by using the appropriate equations of equilibrium for the force system.

Model 10 is fragmentarily illustrated, it being representative of any model capable of being supported in a wind tunnel by usual means, as a sting 11, protruding from the tail of the body, and lying along the model's longitudinal axis. The model includes a housing 12 containing internal braces 14 and 16 of the sting 11, among other components not here germane. Wing panels 18 and 20 appear in Fig. 1, Fig. 2 illustrating the cruciform configuration for which the dynamometer is especially but not exclusively useful, by the presence of wing panel roots 22, 24, 26 and 28 respectively. There are four dynamometers 29, 31, 33, and 35 having central panel mounting blocks 30, 32, 34 and 36 respectively in the model, and a core 38 of the sting 11 between them.

Each dynamometer is identical, and one is provided for each wing panel.

As observed in Fig. 1, the balance 31 for the root 24 of its wing panel consists of a generally square, central panel mounting block 32 in which there are stepped recesses 40 accommodating root 24 (Fig. 2), the latter being held in adjusted position with respect to said block 32 by suitable means, as a worm and gear, set screws or bolts 42. Two trusses 44 and 46 project from opposite sides of mounting block 32, and each consists of a pair of V shaped truss members 50 connected at their inner ends to a block 32 and at their outer ends to a suitable anchor, as plate 52. Each V shaped truss member 50 consists of a force transmitting link 57 and a bending beam 59. Plate 52 is bolted or otherwise fixed to the brace 14 of sting 11, and the counterpart of plate 52 is secured to brace 16. Three bolts 54, 56 and 58 connect mounting block 32 to the core 38, and serve to absorb forces normal to the balance 31 by tension or compression. Because of their substantial unsupported length, forces in the plane of the balance 31 are not absorbed, but are permitted to pass to the trusses 44 and 46 by transmission axially along links 57. A similar arrangement is used for each of the wing panel's mounting blocks.

In testing operations, a pair of strain gages 60 is applied to each V shaped bending beam, in all there being eight gages for each dynamometer. The gages are connected in an appropriate bridge circuit or circuits to obtain strain readings from the dynamometers in response to the imposition of aerodynamic loads on the wing panels.

In operation the applied load on the wing panel of root 24 is resolved into four force vectors whose lines of action are coincident with the neutral axes of the links 57, and whose magnitudes are sensed and measured by strain gages 60 and their circuits. The assumption may reasonably be made that the roll restraint flexure action is perfect and hence the force system consisting of applied force N, C and H and the resultant truss forces are coplanar. Also, it is reasonable to assume that the bending beam deflection is zero and the balance geometry is invariant. Further, it may be seen in Fig. 1 that the resultant truss forces must be non-parallel and non-concurrent. If the member stresses in a truss configuration of this type are known, it is possible, by using the three appropriate equations of equilibrium, to solve for any force applied in the force system plane so long as only three characteristics of the applied force are unknown. Accordingly, the force loadings of the truss members, as measured by the strain gages, is information from which to solve ordinary structures equations which will yield quantitative information of the chord force C, normal force N and hinge moment H of the panels of a cruciform wing.

It is understood that various departures may be made without departing from the scope of the following claims.

What is claimed is:

1. An aerodynamic test model having a longitudinal body and cruciform wings, said wings having shaft-like roots, a support for said model extending axially from the tail of said model, said support having a neck-down core section in juxtaposition with the roots of said wings, said core section being between relatively larger parts of said support, four dynamometers in said body, each dynamometer comprising a wing root mounting block, two sets of trusses and two anchor plates, means attaching a wing root to a mounting block, means securing said mounting block to said core section, said securing means absorbing forces axially of said root and permitting the transmission of forces transversely of said root, each set of trusses comprising two V shaped members, one leg of each member being joined at one end to said mounting block and constituting a force transmitting link and the other leg being joined to one of said anchor plates and constituting a bending beam, means on said bending beam legs to measure the forces transmitted by said force transmitting link legs, and said anchor plate being fixed to said larger part of said support.

2. The structure of claim 1 in which said securing means comprise relatively long pins which are laterally unsupported for the greater portions of their lengths.

3. An aerodynamic model, a support for said model extending axially into the tail of said model, a wing on said model, a root member extending span-wise of said wing and having its free end extending into said model, a dynamometer in said model comprising a mounting block, the free end of said root member being secured to said mounting block, anchor plates spaced from said mounting block and in the plane thereof, trusses connecting said block with said anchor plates, each truss comprising two parallel V-shaped truss members each truss member having one leg connected to said block and acting as a link and the other leg connected to said anchor plate and acting as a beam, and means to measure the forces transmitted by each of said four links.

4. In testing apparatus, a support, dynamometer means on said support, said means comprising a force receiving block, first and second trusses and first and second anchor plates, said trusses being substantially co-planar, each truss extending from said block to a separate one of said anchor plates, each truss comprising two V shaped members, one leg of each member being joined at one end to said block and constituting a force transmitting link and the other leg being joined to the corresponding anchor plate ad constituting a bending beam, means restraining said block to transmittal of forces only in the plane of said trusses, and means on said bending beam legs to measure the forces transmitted by each of said four force transmitting legs.

5. The apparatus of claim 4, said restraining means comprising a plurality of pins extending perpendicularly to the plane of said trusses, each of said pins being connected at one end to said support and at the other end to said block.

References Cited in the file of this patent

UNITED STATES PATENTS

| | | |
|---|---|---|
| 2,350,072 | Simmons | May 30, 1944 |
| 2,359,245 | Ritzmann | Sept. 26, 1944 |
| 2,485,977 | Mains | Oct. 25, 1949 |
| 2,563,425 | Schaevitz | Aug. 7, 1951 |
| 2,597,751 | Ruge | May 20, 1952 |

FOREIGN PATENTS

| | | |
|---|---|---|
| 717,708 | Germany | Feb. 20, 1942 |